US010581976B2

(12) United States Patent
Thompson et al.

(10) Patent No.: US 10,581,976 B2
(45) Date of Patent: Mar. 3, 2020

(54) TRANSMISSION CONTROL OF PROTOCOL STATE EXCHANGE FOR DYNAMIC STATEFUL SERVICE INSERTION

(71) Applicant: A10 Networks, Inc., San Jose, CA (US)

(72) Inventors: Micheal Thompson, Meridian, ID (US); Martin Grimm, Snoqualmie, WA (US); Vernon Richard Groves, Duvall, WA (US); Rajkumar Jalan, Saratoga, CA (US)

(73) Assignee: A10 Networks, Inc., San Jose, CA (US)

(*) Notice: Subject to any disclaimer, the term of this patent is extended or adjusted under 35 U.S.C. 154(b) by 329 days.

(21) Appl. No.: 14/825,096

(22) Filed: Aug. 12, 2015

(65) Prior Publication Data

US 2017/0048356 A1 Feb. 16, 2017

(51) Int. Cl.
*H04L 29/06* (2006.01)
*H04L 29/08* (2006.01)

(52) U.S. Cl.
CPC ............ *H04L 67/141* (2013.01); *H04L 63/10* (2013.01); *H04L 69/163* (2013.01)

(58) Field of Classification Search
None
See application file for complete search history.

(56) References Cited

U.S. PATENT DOCUMENTS 5,218,602 A 6/1993 Grant et al.
5,774,660 A 6/1998 Brendel et al.
5,862,339 A 1/1999 Bonnaure et al.
5,875,185 A 2/1999 Wang et al.
5,935,207 A 8/1999 Logue et al.
(Continued)

FOREIGN PATENT DOCUMENTS

CN 1372662 A 10/2002
CN 1449618 A 10/2003
(Continued)

OTHER PUBLICATIONS

Cardellini et al., "Dynamic Load Balancing on Web-server Systems", IEEE Internet Computing, vol. 3, No. 3, pp. 28-39, May-Jun. 1999.

(Continued)

*Primary Examiner* — Viet D Vu
*Assistant Examiner* — Mohammad Yousuf A. Mian
(74) *Attorney, Agent, or Firm* — Keith Kline; The Kline Law Firm PC (57) ABSTRACT

Provided are methods and systems for a Transmission Control Protocol (TCP) state handoff of a data traffic flow. A method for a TCP state handoff of a data traffic flow comprises determining a TCP state at predetermined times by a state machine unit. The TCP state includes data concerning a session between a client and a server. The TCP state for the predetermined times is stored to a database. A request to apply a predetermined policy to the session is received by a transaction processing unit and, based on the request, a session request associated with the session between the client and the server is sent to an access control unit. The session request is processed by the access control unit based on the TCP state and according to the predetermined policy.

20 Claims, 5 Drawing Sheets

(56) References Cited

U.S. PATENT DOCUMENTS

| | | |
|---|---|---|
| 5,958,053 A | 9/1999 | Denker |
| 5,995,981 A | 11/1999 | Wikstrom |
| 6,003,069 A | 12/1999 | Cavill |
| 6,047,268 A | 4/2000 | Bartoli et al. |
| 6,075,783 A | 6/2000 | Voit |
| 6,131,163 A | 10/2000 | Wiegel |
| 6,219,706 B1 | 4/2001 | Fan et al. |
| 6,259,705 B1 | 7/2001 | Takahashi et al. |
| 6,321,338 B1 | 11/2001 | Porras et al. |
| 6,374,300 B2 | 4/2002 | Masters |
| 6,456,617 B1 | 9/2002 | Oda et al. |
| 6,459,682 B1 | 10/2002 | Ellesson et al. |
| 6,483,600 B1 | 11/2002 | Schuster et al. |
| 6,535,516 B1 | 3/2003 | Leu et al. |
| 6,578,066 B1 | 6/2003 | Logan et al. |
| 6,587,866 B1 | 7/2003 | Modi et al. |
| 6,600,738 B1 | 7/2003 | Alperovich et al. |
| 6,658,114 B1 | 12/2003 | Farn et al. |
| 6,748,414 B1 | 6/2004 | Bournas |
| 6,772,205 B1 | 8/2004 | Lavian et al. |
| 6,772,334 B1 | 8/2004 | Glawitsch |
| 6,779,017 B1 | 8/2004 | Lamberton et al. |
| 6,779,033 B1 | 8/2004 | Watson et al. |
| 6,804,224 B1 | 10/2004 | Schuster et al. |
| 6,952,728 B1 | 10/2005 | Alles et al. |
| 7,010,605 B1 | 3/2006 | Dharmarajan |
| 7,013,482 B1 | 3/2006 | Krumel |
| 7,058,718 B2 | 6/2006 | Fontes et al. |
| 7,069,438 B2 | 6/2006 | Balabine et al. |
| 7,076,555 B1 | 7/2006 | Orman et al. |
| 7,143,087 B2 | 11/2006 | Fairweather |
| 7,167,927 B2 | 1/2007 | Philbrick et al. |
| 7,181,524 B1 | 2/2007 | Lele |
| 7,218,722 B1 | 5/2007 | Turner et al. |
| 7,228,359 B1 | 6/2007 | Monteiro |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,370,353 B2 | 5/2008 | Yang |
| 7,373,500 B2 | 5/2008 | Ramelson et al. |
| 7,391,725 B2 | 6/2008 | Huitema et al. |
| 7,398,317 B2 | 7/2008 | Chen et al. |
| 7,423,977 B1 | 9/2008 | Joshi |
| 7,430,755 B1 | 9/2008 | Hughes et al. |
| 7,463,648 B1 | 12/2008 | Eppstein et al. |
| 7,467,202 B2 | 12/2008 | Savchuk |
| 7,472,190 B2 | 12/2008 | Robinson |
| 7,492,766 B2 | 2/2009 | Cabeca et al. |
| 7,506,360 B1 | 3/2009 | Wilkinson et al. |
| 7,509,369 B1 | 3/2009 | Tormasov |
| 7,512,980 B2 | 3/2009 | Copeland et al. |
| 7,533,409 B2 | 5/2009 | Keane et al. |
| 7,552,323 B2 | 6/2009 | Shay |
| 7,584,262 B1 | 9/2009 | Wang et al. |
| 7,584,301 B1 | 9/2009 | Joshi |
| 7,590,736 B2 | 9/2009 | Hydrie et al. |
| 7,610,622 B2 | 10/2009 | Touitou et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,703,102 B1 | 4/2010 | Eppstein et al. |
| 7,707,295 B1 | 4/2010 | Szeto et al. |
| 7,711,790 B1 | 5/2010 | Barrett et al. |
| 7,733,866 B2 | 6/2010 | Mishra et al. |
| 7,747,748 B2 | 6/2010 | Allen |
| 7,765,328 B2 | 7/2010 | Bryers et al. |
| 7,792,113 B1 | 9/2010 | Foschiano et al. |
| 7,808,994 B1 | 10/2010 | Vinokour et al. |
| 7,826,487 B1 | 11/2010 | Mukerji et al. |
| 7,881,215 B1 | 2/2011 | Daigle et al. |
| 7,948,952 B2 | 5/2011 | Hurtta et al. |
| 7,965,727 B2 | 6/2011 | Sakata et al. |
| 7,970,934 B1 | 6/2011 | Patel |
| 7,979,694 B2 | 7/2011 | Touitou et al. |
| 7,983,258 B1 | 7/2011 | Ruben et al. |
| 7,990,847 B1 | 8/2011 | Leroy et al. |
| 7,991,859 B1 | 8/2011 | Miller et al. |
| 7,992,201 B2 | 8/2011 | Aldridge et al. |
| 8,019,870 B1 | 9/2011 | Eppstein et al. |
| 8,032,634 B1 | 10/2011 | Eppstein et al. |
| 8,081,640 B2 | 12/2011 | Ozawa et al. |
| 8,090,866 B1 | 1/2012 | Bashyam et al. |
| 8,099,492 B2 | 1/2012 | Dahlin et al. |
| 8,116,312 B2 | 2/2012 | Riddoch et al. |
| 8,122,116 B2 | 2/2012 | Matsunaga et al. |
| 8,151,019 B1 | 4/2012 | Le et al. |
| 8,179,809 B1 | 5/2012 | Eppstein et al. |
| 8,185,651 B2 | 5/2012 | Moran et al. |
| 8,191,106 B2 | 5/2012 | Choyi et al. |
| 8,224,971 B1 | 7/2012 | Miller et al. |
| 8,261,339 B2 | 9/2012 | Aldridge et al. |
| 8,266,235 B2 | 9/2012 | Jalan et al. |
| 8,296,434 B1 | 10/2012 | Miller et al. |
| 8,312,507 B2 | 11/2012 | Chen et al. |
| 8,379,515 B1 | 2/2013 | Mukerji |
| 8,499,093 B2 | 7/2013 | Grosser et al. |
| 8,539,075 B2 | 9/2013 | Bali et al. |
| 8,554,929 B1 | 10/2013 | Szeto et al. |
| 8,559,437 B2 | 10/2013 | Mishra et al. |
| 8,560,693 B1 | 10/2013 | Wang et al. |
| 8,584,199 B1 | 11/2013 | Chen et al. |
| 8,595,791 B1 | 11/2013 | Chen et al. |
| RE44,701 E | 1/2014 | Chen et al. |
| 8,675,488 B1 | 3/2014 | Sidebottom et al. |
| 8,681,610 B1 | 3/2014 | Mukerji |
| 8,750,164 B2 | 6/2014 | Casado et al. |
| 8,782,221 B2 | 7/2014 | Han |
| 8,813,180 B1 | 8/2014 | Chen et al. |
| 8,826,372 B1 | 9/2014 | Chen et al. |
| 8,879,427 B2 | 11/2014 | Krumel |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,990,262 B2 | 3/2015 | Chen et al. |
| 9,094,364 B2 | 7/2015 | Jalan et al. |
| 9,106,561 B2 | 8/2015 | Jalan et al. |
| 9,137,301 B1 | 9/2015 | Dunlap et al. |
| 9,154,577 B2 | 10/2015 | Jalan et al. |
| 9,154,584 B1 | 10/2015 | Han |
| 9,215,275 B2 | 12/2015 | Kannan et al. |
| 9,219,751 B1 | 12/2015 | Chen et al. |
| 9,253,152 B1 | 2/2016 | Chen et al. |
| 9,270,705 B1 | 2/2016 | Chen et al. |
| 9,270,774 B2 | 2/2016 | Jalan et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,386,088 B2 | 7/2016 | Zheng et al. |
| 9,432,463 B2 * | 8/2016 | Bowman ............... H04L 45/742 |
| 9,531,846 B2 | 12/2016 | Han et al. |
| 2001/0042200 A1 | 11/2001 | Lamberton et al. |
| 2001/0049741 A1 | 12/2001 | Skene et al. |
| 2002/0026515 A1 | 2/2002 | Michielsens et al. |
| 2002/0032777 A1 | 3/2002 | Kawata et al. |
| 2002/0032799 A1 | 3/2002 | Wiedeman et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0133491 A1 | 9/2002 | Sim et al. |
| 2002/0138618 A1 | 9/2002 | Szabo |
| 2002/0141386 A1 | 10/2002 | Minert et al. |
| 2002/0143991 A1 | 10/2002 | Chow et al. |

(56) References Cited

U.S. PATENT DOCUMENTS

| | | |
|---|---|---|
| 2002/0178259 A1 | 11/2002 | Doyle et al. |
| 2002/0188678 A1 | 12/2002 | Edecker et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0035409 A1 | 2/2003 | Wang et al. |
| 2003/0035420 A1 | 2/2003 | Niu |
| 2003/0061506 A1 | 3/2003 | Cooper et al. |
| 2003/0065762 A1 | 4/2003 | Stolorz et al. |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0195962 A1 | 10/2003 | Kikuchi et al. |
| 2004/0010545 A1 | 1/2004 | Pandya |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0103315 A1 | 5/2004 | Cooper et al. |
| 2004/0111516 A1 | 6/2004 | Cain |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0250059 A1 | 12/2004 | Ramelson et al. |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0039033 A1 | 2/2005 | Meyers et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0163073 A1 | 7/2005 | Heller et al. |
| 2005/0165909 A1* | 7/2005 | Cromer ............... H04W 8/18 709/219 |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0259586 A1 | 11/2005 | Hafid et al. |
| 2005/0281190 A1 | 12/2005 | McGee et al. |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0041745 A1 | 2/2006 | Parnes |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0164978 A1 | 7/2006 | Werner et al. |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0022479 A1 | 1/2007 | Sikdar et al. |
| 2007/0027991 A1* | 2/2007 | Sikdar ............... H04L 63/0428 709/227 |
| 2007/0044142 A1* | 2/2007 | Yoon ............... H04L 63/0254 726/3 |
| 2007/0076653 A1 | 4/2007 | Park et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0124502 A1 | 5/2007 | Li |
| 2007/0156919 A1 | 7/2007 | Potti et al. |
| 2007/0165622 A1 | 7/2007 | O'Rourke et al. |
| 2007/0180119 A1 | 8/2007 | Khivesara et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0242738 A1 | 10/2007 | Park et al. |
| 2007/0243879 A1 | 10/2007 | Park et al. |
| 2007/0245018 A1* | 10/2007 | Bhola ............... G06F 21/6218 709/225 |
| 2007/0245090 A1 | 10/2007 | King et al. |
| 2007/0248009 A1 | 10/2007 | Petersen |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0016161 A1 | 1/2008 | Tsirtsis et al. |
| 2008/0031263 A1 | 2/2008 | Ervin et al. |
| 2008/0076432 A1 | 3/2008 | Senarath et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0120129 A1 | 5/2008 | Seubert et al. |
| 2008/0120364 A1* | 5/2008 | Chari ............... G06Q 30/02 709/203 |
| 2008/0134332 A1 | 6/2008 | Keohane et al. |
| 2008/0162679 A1 | 7/2008 | Maher et al. |
| 2008/0225722 A1 | 9/2008 | Khemani et al. |
| 2008/0228781 A1 | 9/2008 | Chen et al. |
| 2008/0250099 A1 | 10/2008 | Shen et al. |
| 2008/0253390 A1 | 10/2008 | Das et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2008/0298303 A1 | 12/2008 | Tsirtsis |
| 2009/0024722 A1 | 1/2009 | Sethuraman et al. |
| 2009/0031415 A1 | 1/2009 | Aldridge et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0271472 A1 | 10/2009 | Scheifler et al. |
| 2009/0285196 A1 | 11/2009 | Lee et al. |
| 2009/0313379 A1 | 12/2009 | Rydnell et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0042869 A1 | 2/2010 | Szabo et al. |
| 2010/0054139 A1 | 3/2010 | Chun et al. |
| 2010/0061319 A1 | 3/2010 | Aso et al. |

(56) References Cited

U.S. PATENT DOCUMENTS

| | | |
|---|---|---|
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0095018 A1 | 4/2010 | Khemani et al. |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0162378 A1 | 6/2010 | Jayawardena et al. |
| 2010/0205310 A1 | 8/2010 | Altshuler et al. |
| 2010/0210265 A1 | 8/2010 | Borzsei et al. |
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1 | 9/2010 | Wei |
| 2010/0235507 A1 | 9/2010 | Szeto et al. |
| 2010/0235522 A1 | 9/2010 | Chen et al. |
| 2010/0235880 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0083174 A1 | 4/2011 | Aldridge et al. |
| 2011/0093522 A1 | 4/2011 | Chen et al. |
| 2011/0099403 A1 | 4/2011 | Miyata et al. |
| 2011/0099623 A1 | 4/2011 | Garrard et al. |
| 2011/0107116 A1* | 5/2011 | Diab .............. H04L 12/10 713/300 |
| 2011/0110294 A1 | 5/2011 | Valluri et al. |
| 2011/0145324 A1 | 6/2011 | Reinart et al. |
| 2011/0149879 A1 | 6/2011 | Noriega et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshehandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066371 A1 | 3/2012 | Patel et al. |
| 2012/0084419 A1 | 4/2012 | Kannan et al. |
| 2012/0084460 A1 | 4/2012 | McGinnity et al. |
| 2012/0106355 A1 | 5/2012 | Ludwig |
| 2012/0117382 A1 | 5/2012 | Larson et al. |
| 2012/0117571 A1 | 5/2012 | Davis et al. |
| 2012/0144014 A1 | 6/2012 | Natham et al. |
| 2012/0144015 A1 | 6/2012 | Jalan et al. |
| 2012/0151353 A1 | 6/2012 | Joanny |
| 2012/0170548 A1 | 7/2012 | Rajagopalan et al. |
| 2012/0173759 A1 | 7/2012 | Agarwal et al. |
| 2012/0179770 A1 | 7/2012 | Jalan et al. |
| 2012/0191839 A1 | 7/2012 | Maynard |
| 2012/0215910 A1 | 8/2012 | Wada |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2012/0311116 A1 | 12/2012 | Jalan et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0100958 A1 | 4/2013 | Jalan et al. |
| 2013/0124713 A1 | 5/2013 | Feinberg et al. |
| 2013/0125230 A1* | 5/2013 | Koponen .......... H04L 41/0823 726/13 |
| 2013/0135996 A1 | 5/2013 | Torres et al. |
| 2013/0136139 A1 | 5/2013 | Zheng et al. |
| 2013/0148500 A1 | 6/2013 | Sonoda et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0198385 A1 | 8/2013 | Han et al. |
| 2013/0250765 A1 | 9/2013 | Ehsan et al. |
| 2013/0258846 A1 | 10/2013 | Damola |
| 2013/0282791 A1 | 10/2013 | Kruglick |
| 2014/0012972 A1 | 1/2014 | Han |
| 2014/0089500 A1 | 3/2014 | Sankar et al. |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0258465 A1 | 9/2014 | Li |
| 2014/0258536 A1 | 9/2014 | Chiang |
| 2014/0269728 A1 | 9/2014 | Jalan et al. |
| 2014/0280470 A1* | 9/2014 | Calo ................ H04L 67/148 709/203 |
| 2014/0286313 A1 | 9/2014 | Fu et al. |
| 2014/0298091 A1 | 10/2014 | Carlen et al. |
| 2014/0330982 A1 | 11/2014 | Jalan et al. |
| 2014/0334485 A1 | 11/2014 | Jain et al. |
| 2014/0359052 A1 | 12/2014 | Joachimpillai et al. |
| 2015/0026794 A1 | 1/2015 | Zuk et al. |
| 2015/0039671 A1 | 2/2015 | Jalan et al. |
| 2015/0156223 A1 | 6/2015 | Xu et al. |
| 2015/0215436 A1 | 7/2015 | Kancherla |
| 2015/0237173 A1 | 8/2015 | Virkki et al. |
| 2015/0244566 A1 | 8/2015 | Puimedon |
| 2015/0281087 A1 | 10/2015 | Jalan et al. |
| 2015/0281104 A1 | 10/2015 | Golshan et al. |
| 2015/0296058 A1 | 10/2015 | Jalan et al. |
| 2015/0312092 A1 | 10/2015 | Golshan et al. |
| 2015/0312268 A1 | 10/2015 | Ray |
| 2015/0333988 A1 | 11/2015 | Jalan et al. |
| 2015/0350048 A1 | 12/2015 | Sampat et al. |
| 2015/0350379 A1 | 12/2015 | Jalan et al. |
| 2016/0014052 A1 | 1/2016 | Han |
| 2016/0014126 A1 | 1/2016 | Jalan et al. |
| 2016/0036778 A1 | 2/2016 | Chen et al. |
| 2016/0042014 A1 | 2/2016 | Jalan et al. |
| 2016/0043901 A1 | 2/2016 | Sankar et al. |
| 2016/0044095 A1 | 2/2016 | Sankar et al. |
| 2016/0050233 A1 | 2/2016 | Chen et al. |
| 2016/0088074 A1 | 3/2016 | Kannan et al. |
| 2016/0105395 A1 | 4/2016 | Chen et al. |
| 2016/0105446 A1 | 4/2016 | Chen et al. |
| 2016/0119382 A1 | 4/2016 | Chen et al. |
| 2016/0139910 A1 | 5/2016 | Ramanathan et al. |
| 2016/0156708 A1 | 6/2016 | Jalan et al. |
| 2016/0173579 A1 | 6/2016 | Jalan et al. |
| 2017/0048107 A1 | 2/2017 | Dosovitsky et al. |

FOREIGN PATENT DOCUMENTS

| | | |
|---|---|---|
| CN | 1473300 A | 2/2004 |
| CN | 1529460 A | 9/2004 |
| CN | 1575582 A | 2/2005 |
| CN | 1714545 A | 12/2005 |
| CN | 1725702 A | 1/2006 |
| CN | 1910869 A | 2/2007 |
| CN | 101004740 A | 7/2007 |
| CN | 101094225 A | 12/2007 |
| CN | 101163336 A | 4/2008 |

(56) References Cited

FOREIGN PATENT DOCUMENTS

| | | |
|---|---|---|
| CN | 101169785 A | 4/2008 |
| CN | 101189598 A | 5/2008 |
| CN | 101193089 A | 6/2008 |
| CN | 101247349 A | 8/2008 |
| CN | 101261644 A | 9/2008 |
| CN | 101442425 A | 5/2009 |
| CN | 101495993 A | 7/2009 |
| CN | 101682532 A | 3/2010 |
| CN | 101878663 A | 11/2010 |
| CN | 102123156 A | 7/2011 |
| CN | 102143075 A | 8/2011 |
| CN | 102546590 A | 7/2012 |
| CN | 102571742 A | 7/2012 |
| CN | 102577252 A | 7/2012 |
| CN | 102918801 A | 2/2013 |
| CN | 103533018 A | 1/2014 |
| CN | 103944954 A | 7/2014 |
| CN | 104040990 A | 9/2014 |
| CN | 104067569 A | 9/2014 |
| CN | 104106241 A | 10/2014 |
| CN | 104137491 A | 11/2014 |
| CN | 104796396 A | 7/2015 |
| CN | 102577252 B | 3/2016 |
| CN | 102918801 B | 5/2016 |
| CN | 102571742 B | 7/2016 |
| EP | 1209876 A2 | 5/2002 |
| EP | 1770915 A1 | 4/2007 |
| EP | 1885096 A1 | 2/2008 |
| EP | 02296313 | 3/2011 |
| EP | 2577910 A2 | 4/2013 |
| EP | 2622795 A2 | 8/2013 |
| EP | 2647174 A2 | 10/2013 |
| EP | 2760170 A1 | 7/2014 |
| EP | 2772026 A1 | 9/2014 |
| EP | 2901308 A2 | 8/2015 |
| EP | 2760170 B1 | 12/2015 |
| HK | 1182560 | 11/2013 |
| HK | 1183569 | 12/2013 |
| HK | 1183996 | 1/2014 |
| HK | 1189438 | 6/2014 |
| HK | 1198565 A1 | 5/2015 |
| HK | 1198848 A1 | 6/2015 |
| HK | 1199153 A1 | 6/2015 |
| HK | 1199779 A1 | 7/2015 |
| HK | 1200617 A | 8/2015 |
| IN | 39/2015 | 9/2015 |
| IN | 261CHE2014 A | 7/2016 |
| IN | 1668CHENP2015 A | 7/2016 |
| JP | H09-097233 | 4/1997 |
| JP | 1999096128 | 4/1999 |
| JP | H11-338836 | 10/1999 |
| JP | 2000276432 A | 10/2000 |
| JP | 2000307634 A | 11/2000 |
| JP | 2001051859 A | 2/2001 |
| JP | 2001298449 A | 10/2001 |
| JP | 2002091936 A | 3/2002 |
| JP | 2003141068 A | 5/2003 |
| JP | 2003186776 A | 7/2003 |
| JP | 2005141441 A | 6/2005 |
| JP | 2006332825 A | 12/2006 |
| JP | 2008040718 A | 2/2008 |
| JP | 2009500731 A | 1/2009 |
| JP | 2013528330 A | 7/2013 |
| JP | 2014504484 A | 2/2014 |
| JP | 2014143686 A | 8/2014 |
| JP | 2015507380 A | 3/2015 |
| JP | 5855663 B2 | 12/2015 |
| JP | 5906263 B2 | 4/2016 |
| JP | 5913609 B2 | 4/2016 |
| JP | 5946189 B2 | 6/2016 |
| KR | 100830413 B1 | 5/2008 |
| KR | 20130096624 A | 8/2013 |
| KR | 101576585 B1 | 12/2015 |
| KR | 101632187 B1 | 6/2016 |
| TW | 269763 B | 2/1996 |
| TW | 425821 B | 3/2001 |
| TW | 444478 B | 7/2001 |
| WO | WO2001013228 | 2/2001 |
| WO | WO2001014990 | 3/2001 |
| WO | WO2001045349 | 6/2001 |
| WO | WO2003103237 | 12/2003 |
| WO | WO2004084085 A1 | 9/2004 |
| WO | WO2006098033 A1 | 9/2006 |
| WO | WO2008053954 A1 | 5/2008 |
| WO | WO2008078593 A1 | 7/2008 |
| WO | WO2011049770 A2 | 4/2011 |
| WO | WO2011079381 A1 | 7/2011 |
| WO | WO2011149796 A2 | 12/2011 |
| WO | WO2012050747 A2 | 4/2012 |
| WO | WO2012075237 A2 | 6/2012 |
| WO | WO2012083264 A2 | 6/2012 |
| WO | WO2012097015 A2 | 7/2012 |
| WO | WO2013070391 A1 | 5/2013 |
| WO | WO2013081952 A1 | 6/2013 |
| WO | WO2013096019 A1 | 6/2013 |
| WO | WO2013112492 A1 | 8/2013 |
| WO | WO2014031046 A1 | 2/2014 |
| WO | WO2014052099 A2 | 4/2014 |
| WO | WO2014088741 A1 | 6/2014 |
| WO | WO2014093829 A1 | 6/2014 |
| WO | WO2014138483 A1 | 9/2014 |
| WO | WO2014144837 A1 | 9/2014 |
| WO | WO2014179753 A2 | 11/2014 |
| WO | WO2015153020 A1 | 10/2015 |
| WO | WO2015164026 A1 | 10/2015 |

OTHER PUBLICATIONS

Spatscheck et al., "Optimizing TCP Forwarder Performance", IEEE/ACM Transactions on Networking, vol. 8, No. 2, Apr. 2000.

Kjaer et al. "Resource allocation and disturbance rejection in web servers using SLAs and virtualized servers", IEEE Transactions on Network and Service Management, IEEE, US, vol. 6, No. 4, Dec. 1, 2009.

Sharifian et al. "An approximation-based load-balancing algorithm with admission control for cluster web servers with dynamic workloads", The Journal of Supercomputing, Kluver Academic Publishers, BO, vol. 53, No. 3, Jul. 3, 2009.

Goldszmidt et al. NetDispatcher: A TCP Connection Router, IBM Research Report RC 20853, May 19, 1997.

Koike et al., "Transport Middleware for Network-Based Control," IEICE Technical Report, Jun. 22, 2000, vol. 100, No. 53, pp. 13-18.

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

Gite, Vivek, "Linux Tune Network Stack (Buffers Size) to Increase Networking Performance," accessed Apr. 13, 2016 at URL: <<http://www.cyberciti.biz/faq/linux-tcp-tuning/>>, Jul. 8, 2009, 24 pages.

"Tcp—TCP Protocol", Linux Programmer's Manual, accessed Apr. 13, 2016 at URL: <<https://www.freebsd.org/cgi/man.cgi?query=tcp&apropos=0&sektion=7&manpath=SuSE+Linux%2Fi386+11.0&format=asci>>, Nov. 25, 2007, 11 pages.

"Enhanced Interior Gateway Routing Protocol", Cisco, Document ID 16406, Sep. 9, 2005 update, 43 pages.

Crotti, Manuel et al., "Detecting HTTP Tunnels with Statistical Mechanisms", IEEE International Conference on Communications, Jun. 24-28, 2007, pp. 6162-6168.

Haruyama, Takahiro et al., "Dial-to-Connect VPN System for Remote DLNA Communication", IEEE Consumer Communications and Networking Conference, CCNC 2008. 5th IEEE, Jan. 10-12, 2008, pp. 1224-1225.

Chen, Jianhua et al., "SSL/TLS-based Secure Tunnel Gateway System Design and Implementation", IEEE International Workshop on Anti-counterfeiting, Security, Identification, Apr. 16-18, 2007, pp. 258-261.

(56) References Cited

OTHER PUBLICATIONS

"EIGRP MPLS VPN PE-CE Site of Origin (SoO)", Cisco Systems, Feb. 28, 2006, 14 pages.

* cited by examiner

TRANSMISSION CONTROL OF PROTOCOL STATE EXCHANGE FOR DYNAMIC STATEFUL SERVICE INSERTION

TECHNICAL FIELD

This disclosure relates generally to data processing and, more particularly, to transmission of control protocol (TCP) state exchange for dynamic stateful service insertion.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A stateful service is a service in which subsequent requests to the service depend on the outcome of the first request. The service can keep track of requests made earlier and may need more recent requests to establish a session. Thus, a state of a session between a client and a server may need to be persisted to a database. The stateful service may be exemplified by a call for an application programmable interface authentication. In this example, a user needs to send credentials to the service and the service may provide the user with a token or save a session. Subsequent requests from the user may include the token so that the service can check the status of the session that was created with the first request. Thus, a subsequent request depends on the outcome of the first request.

A stateful service insertion is an insertion of an external stateful service into a data traffic flow. In case of non-transparent stateful service insertion, the data packets are redirected to a service, such as a web proxy, which requires the data packet to be addressed to the service. In case of a transparent stateful service insertion, the data packets are redirected to a service, such as a firewall, which does not require the data packet to be specifically addressed to the service.

The stateful service insertion is usually performed using a source network address. However, conventional TCP state exchange techniques do not allow for providing transferring connection states for real-time traffic flow. As a result, stateful service insertion cannot be implemented using a data traffic endpoint. Furthermore, even though there are some methods for TCP state transfers for the cases where two nodes are used, these methods are ineffective for a greater number of nodes.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for a TCP state handoff of a data traffic flow. Specifically, a system for a TCP state handoff of a data traffic flow may comprise a state machine unit, a transaction processing unit, and an access control unit. The state machine unit may be operable to determine a TCP state at predetermined times. The TCP state may include data concerning a session between a client and a server. The transaction processing unit may be operable to store the TCP state for the predetermined times to a database, receive a request to apply a predetermined policy to the session, and based on the request, send a session request associated with the session between the client and the server to the access control unit. The access control unit may be operable to process the session request based on the TCP state and according to the predetermined policy.

According to another approach of the present disclosure, there is provided a method for a TCP state handoff of a data traffic flow. The method may commence with determining a TCP state at predetermined times by a state machine unit. The TCP state may include data concerning a session between a client and a server. The method may continue with storing the TCP state for the predetermined times to a database. The method may further include receiving, by a transaction processing unit, a request to apply a predetermined policy to the session. Based on the request, the transaction processing unit may send a session request associated with the session between the client and the server to the access control unit. The session request may be processed based on the TCP state and according to the predetermined policy.

In further example embodiments of the present disclosure, the method operations are stored on a machine-readable medium comprising instructions, which when implemented by one or more processors perform the recited operations. In yet further example embodiments, hardware systems, or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

Embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

As outlined in the summary, the embodiments of the present disclosure are directed to a TCP state handoff of a data traffic flow. A connection between two TCP devices (e.g. between a client and a server) can begin in a null state with no connections present. A connection process can go through a series of states to establish a connection between two TCP devices. Upon occurrence of an event causing the connection to be closed, the connection may return to a closed state. States of the connection between the client and the server can also be referred to as TCP states.

A TCP state handoff is a process of migration of an established TCP state from an original node to a new node. During the TCP state handoff, one TCP socket endpoint can seamlessly migrate from one node to the other node. After such TCP state handoff, the new node may send data packets directly to the other TCP endpoint. Content-aware request distribution among servers performed using the TCP state handoff may enable intelligent distribution of data packets, provide quality of service requirements for different types of contents, and improve overall cluster performance.

Methods and systems for a TCP state handoff of a data traffic flow of the present disclosure are directed to transferring the TCP state to any node in a network that may need to be brought up into a session between the client and the server. The purpose of bringing up a new node may include providing a secure communication, speeding up a session between the client and the server, and so forth.

More specifically, there may exist a session, such as a HyperText Transfer Protocol (HTTP) transaction, between the client and the server, and a network system (for example, a security system) may determine that scrutiny needs to be applied to the session. In this case, conventional methods require sending a reset command and then setting up a data traffic flow after the resetting, or dropping some packets so that the data traffic flow may be re-established. However, such conventional methods may cause adverse effects on the network performance.

According to the methods and system of the present disclosure, security functions may be performed by an access control unit. In some example embodiments, the access control unit may include a web application firewall. The web application firewall may be operable to filter access to the server (for example, to a web application associated with the server) for the client by inspecting both the data traffic flowing towards the server and the response data traffic flowing from the server. A transaction processing unit may be responsible for processing transactions between the clients and the server. The transaction processing unit may determine that a session needs to be processed by the access control unit for security purposes. The transaction processing unit may send a signal to the access control unit informing the firewall that there is a session to which security policies need to be applied. The transaction processing unit may further provide the access control unit with information about a current TCP state of the session. For this purpose, the transaction processing unit may send a magic packet containing information concerning a current TCP state of the session. The magic packet can include data packet having a sequence of bytes that can be sent as any network- and transport-layer protocol or can be inserted into data packets of any standard protocols of higher layer, such as User Datagram Protocol or Internetwork Packet Exchange. The access control unit may operate in a stand-by mode and may activate upon receiving the magic packet.

Alternatively, the information about a current TCP state of the session may be stored in a database. The transaction processing unit may provide the access control unit with an entry in the database so that the access control unit can obtain the information about a current TCP state of the session by looking up the database. The access control unit may apply predetermined policies to data packets of the session and re-establish the session based on the TCP state.

Figure 1:
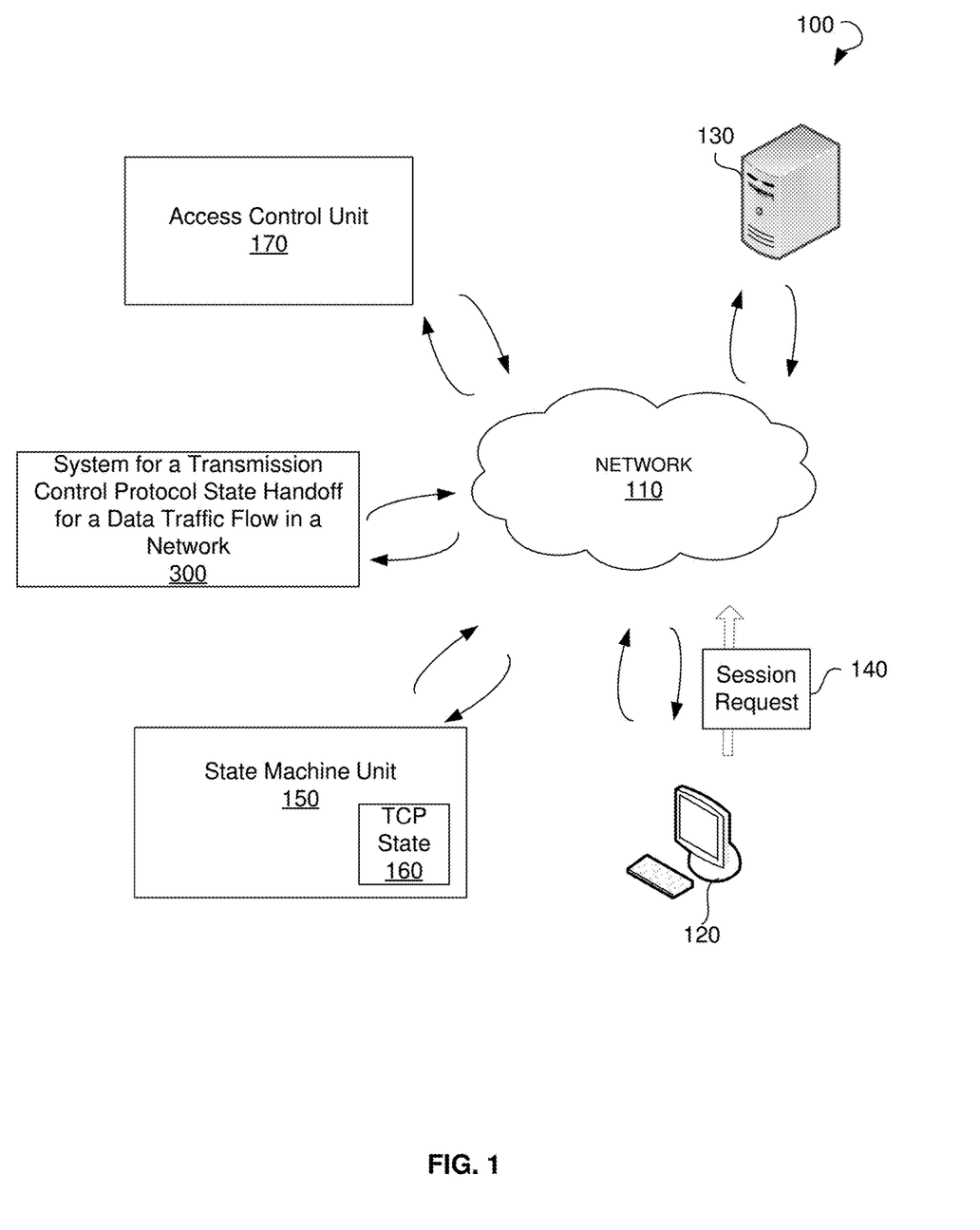
FIG. 1 shows an environment, within which methods and systems for a TCP state handoff of a data traffic flow can be implemented.

Referring now to the drawings, FIG. 1 illustrates an environment 100 within which methods and systems for a TCP state handoff of a data traffic flow can be implemented. The environment 100 may include a network 110, a client 120, a server 130, and a system 300 for a TCP state handoff of a data traffic flow. The client 120 may include a network machine or a network resource that sends a session request 140 to the server 130. The client 120 and the server 130 may communicate with each other using the network 110.

The network 110 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The network 110 may include a network of data processing nodes that are interconnected for the purpose of data communication.

A state machine unit 150 may be tracking a TCP state 160 of a session between the client 120 and the server 130. The system 300 may be operable to review all data packets, such as the session request 140, sent between the client 120 and the server 130. If the system 300 determines that security policies need to be applied to the session request 140, the system forwards the session request 140 to an access control unit 170. The access control unit 170 may process the session request 140 according to the security policies and re-establish the session based on the TCP state.

Figure 2:
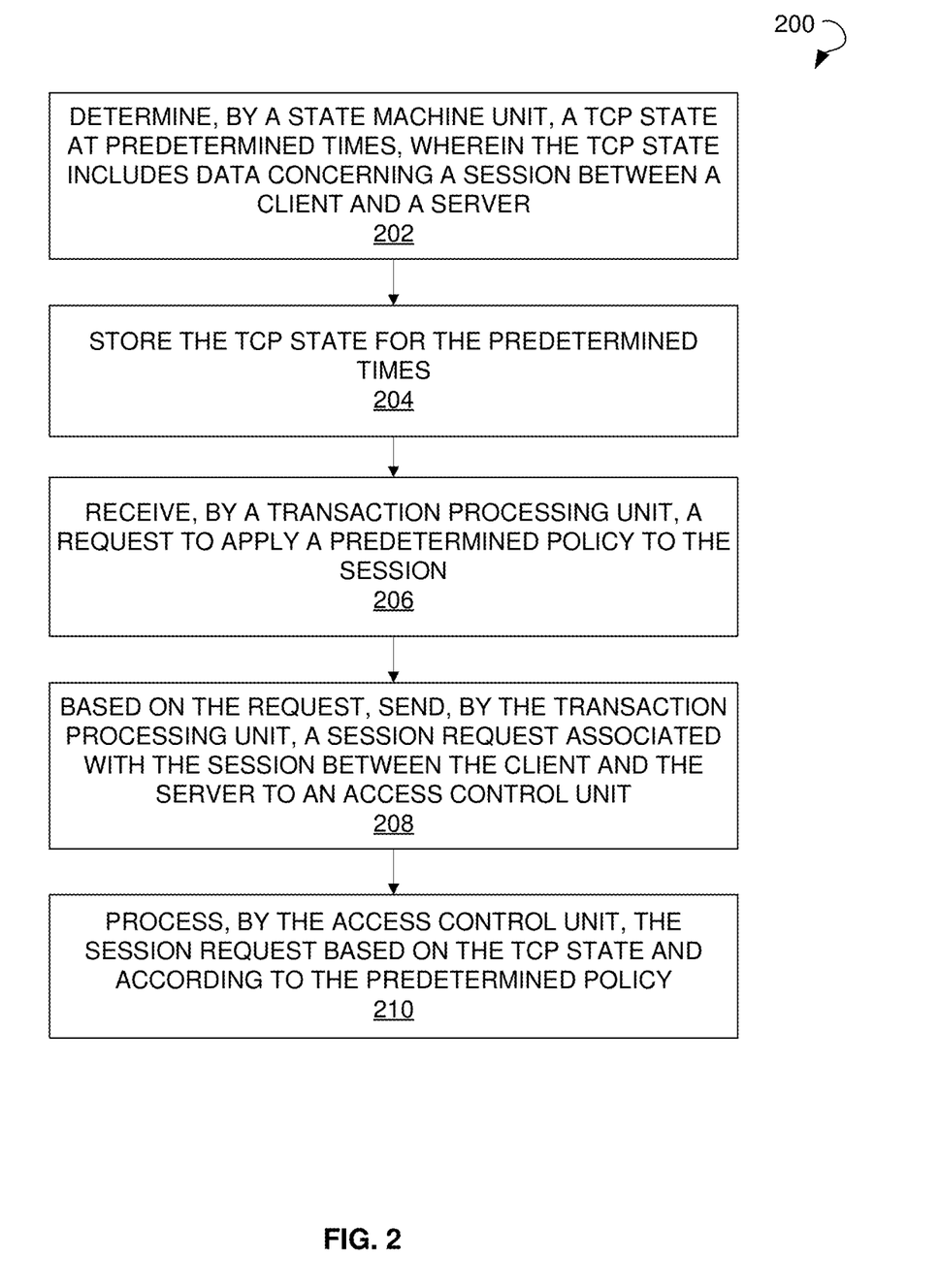
FIG. 2 is a process flow diagram of a method for a TCP state handoff of a data traffic flow.

FIG. 2 shows a process flow diagram of a method 200 for a TCP state handoff of a data traffic flow, according to an example embodiment. In some embodiments, the operations may be combined, performed in parallel, or performed in a different order. The method 200 may also include additional or fewer operations than those illustrated. The method 200 may be performed by processing logic that may comprise hardware (e.g., decision making logic, dedicated logic, programmable logic, and microcode), software (such as software run on a general-purpose computer system or a dedicated machine), or a combination of both.

The method 200 may commence at operation 202 with determining, by a state machine unit, a TCP state for sessions between clients and servers at predetermined times. In example embodiments, the TCP state may include data concerning a session between a client and a server. The data associated with the session may include at least one or more of the following: a source port destination, a current sequence number, a window, a timestamp, a timer, and so forth.

The method 200 may continue with storing the TCP state for a predetermined number of times to a database at operation 204. In example embodiments, the TCP state may be stored to the state machine unit. In further embodiments, a further state machine unit may be initialized. The TCP state may be stored to the further state machine unit.

The method 200 may further include receiving, by a transaction processing unit, a request to apply a predetermined policy to the session at operation 206. In some embodiments, the transaction processing unit may communicate with Distributed Denial of Service (DDoS) units. A DDoS unit may be operable to inspect data traffic flow between the client and the server and notify the transaction processing unit in case predetermined policies (for example, security policies) are needed to be applied to the data traffic flow.

Based on the request, the transaction processing unit may send a session request associated with the session between the client and the server to an access control unit at operation 208. In some embodiments, sending the session request may be delayed by the transaction processing unit until the state machine unit determines the TCP state.

In further embodiments, the storing of the TCP state may include encoding the TCP state into a signal, such as an in-band signal and/or out-of-band signal. The signal may be sent to the access control unit.

In some embodiments, the session request may be sent to the access control unit using a magic packet. The magic packet may include the TCP state and instructions on how to process the session according to the predetermined policy. Upon receiving the magic packet, the access control unit may be activated (for example, switched from a stand-by mode to an active mode).

At operation 210, the method 200 may include processing, by the access control unit, the session request based on the TCP state and according to the predetermined policy. The predetermined policy may include one or more of the following: a security policy, a forwarding policy, and so forth.

In some embodiments, the processing includes sending a reset request to the client. The reset request may prompt the client to resend the session request. Based on the session request resent by the client, the session between the client and the server may be established.

In an example embodiment, the processing of the session request may include establishing a further session between the client and the server. The further session may be established based on the TCP state retrieved by the access control unit from the database.

Figure 3:
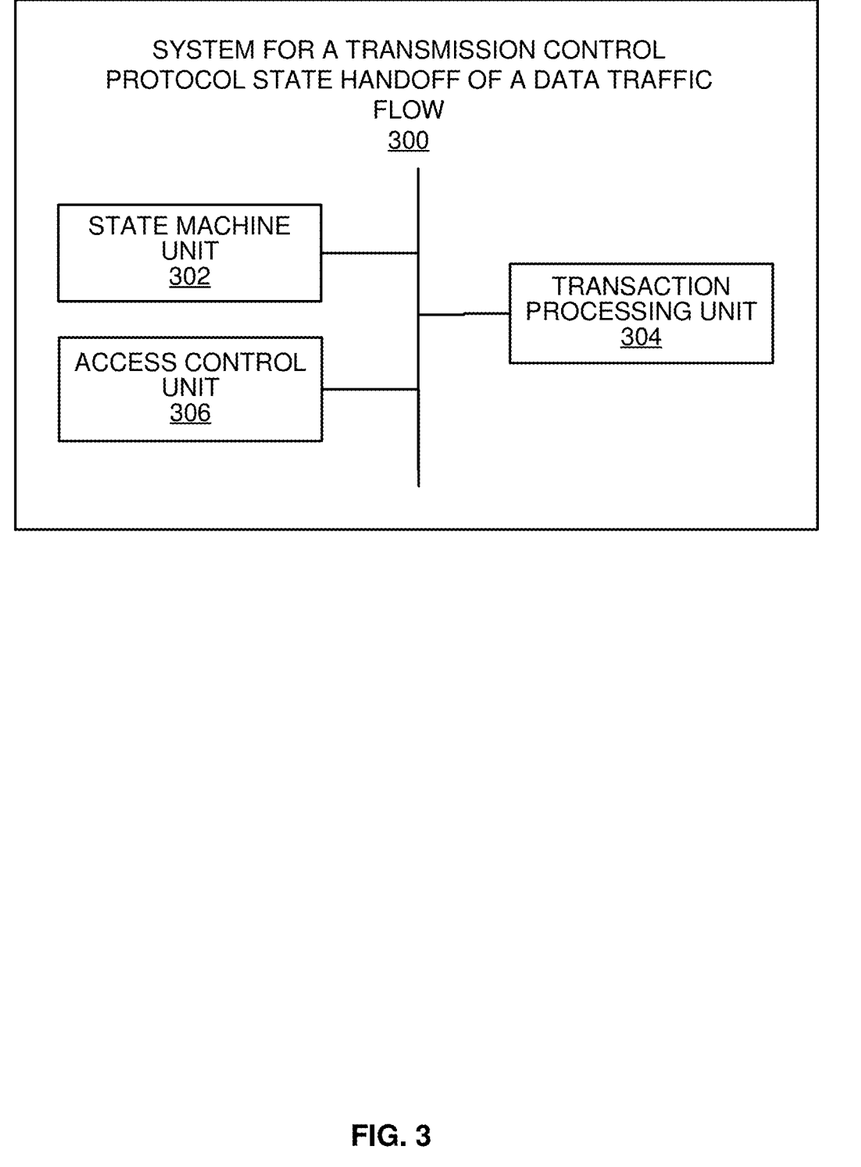
FIG. 3 is a block diagram illustrating a system for a TCP state handoff of a data traffic flow.

FIG. 3 shows a block diagram illustrating various modules of an example system 300 for a TCP state handoff of a data traffic flow. Specifically, the system 300 may include a state machine unit 302, a transaction processing unit 304, and an access control unit 306.

The state machine unit 302 may be operable to determine a TCP state at predetermined times. The TCP state may include data concerning a session between a client and a server. The data concerning the session may include at least one or more of the following: a source port destination, a current sequence number, a window, a timestamp, and a timer.

The transaction processing unit 304 may be operable to store the TCP state for the predetermined times to a database. In some embodiments, the TCP state may be stored to the state machine unit 302. In further embodiments, the storing of the TCP state may include initializing a further state machine unit and storing the TCP state to the further state machine unit.

Alternatively, the storing of the TCP state may include encoding the TCP state into a signal and sending the signal to the access control unit 306.

The transaction processing unit 304 may be further operable to receive a request to apply a predetermined policy to the session. Based on the request, the transaction processing unit 304 may send a session request associated with the session between the client and the server to the access control unit 306.

In some embodiments, the session request may be sent to the access control unit using a magic packet. The magic packet may include the TCP state and instructions to process the session according to the predetermined policy.

The access control unit 306 may be operable to process the session request based on the TCP state and according to the predetermined policy. In some embodiments, the processing of the session request by the access control unit 306 may include establishing a further session between the client and the server. The further session may be established based on the TCP state retrieved by the access control unit 306.

In further example embodiments, the processing may include the access control unit 306 sending a reset request to the client. The reset request may prompt the client to resend the session request. Upon receiving the session request resent by the client, a session between a client and a server may be established.

Figure 4:
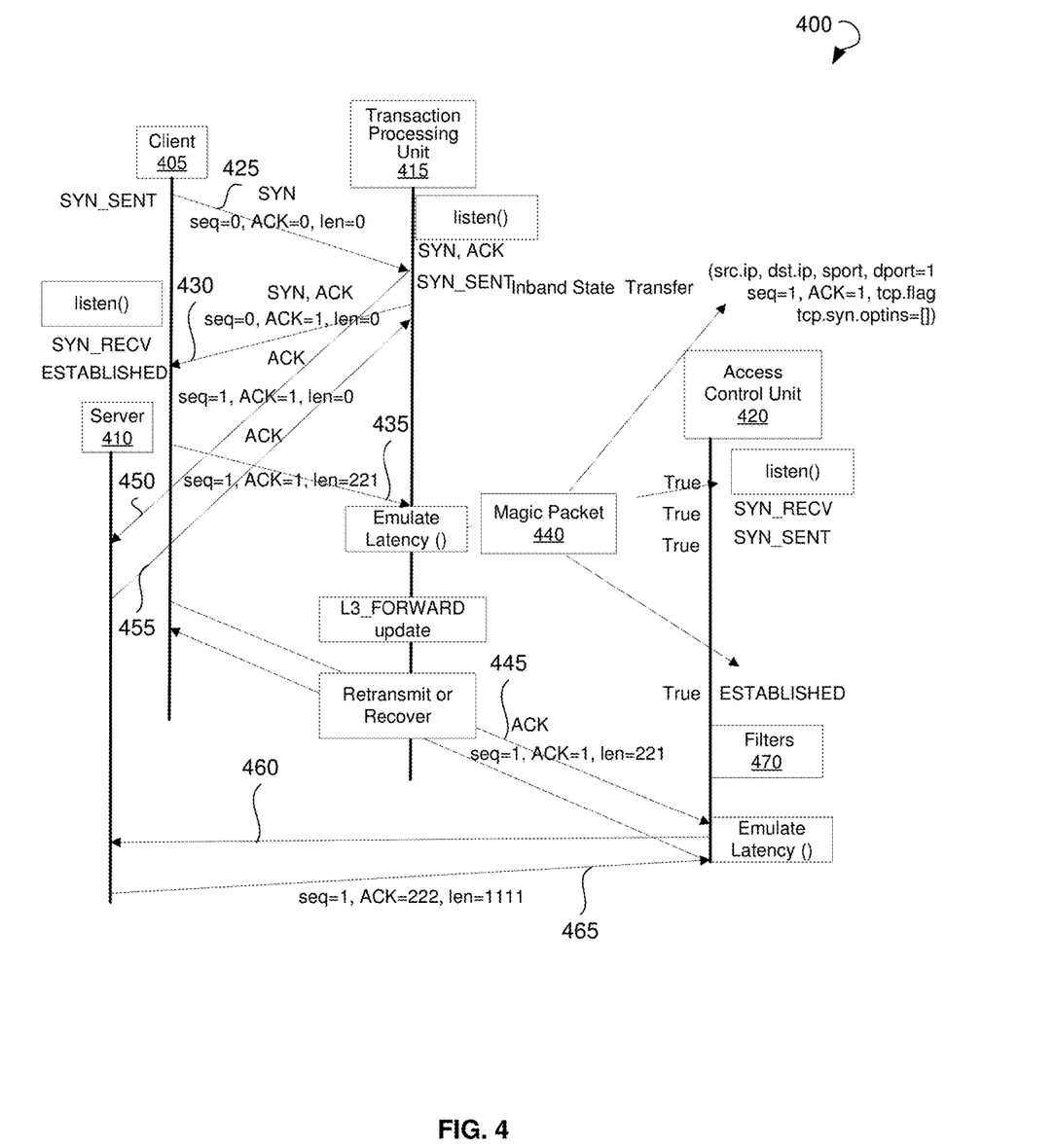
FIG. 4 is a schematic diagram showing a TCP state handoff for a data packet flow between a client and a server.

FIG. 4 is a schematic diagram 400 showing a TCP state handoff for a data packet flow between a client and a server, according to an example embodiment. FIG. 4 shows an embodiment when there is an established session between a client 405 and a server 410. A transaction processing unit 415 may determine that a predetermined policy that requires a data traffic flow associated with the session is to be sent to an access control unit 420.

The client 405 may send a "SYNchronize" message 425 to the transaction processing unit 415. The transaction processing unit 415 receives the "SYNchronize" message 425 from the client 405 and sends a "SYNchronize-AC- Knowledgement" message 430 to the client 405. The client 405 receives the "SYNchronize-ACKnowledgement" message 430 from the transaction processing unit 415 and sends an "ACKnowledgement" message 435 to the transaction processing unit 415.

Additionally, the transaction processing unit 415 may send an "ACKnowledgement" message 450 to the server 410. In turn, the server 410 may send an "ACKnowledgement" message 455 to the transaction processing unit 415. Furthermore, an access control unit 420 may exchange messages 460, 465 with the server 410.

Upon receiving the "SYNchronize-ACKnowledgement" message 430, the transaction processing unit 415 may emulate latency and send a magic packet 440 to the access control unit 420. The latency may correspond to a time needed by a state machine unit (not shown) to establish the TCP state of the session established between the client 405 and the server 410. Therefore, data packets of the data traffic flow may be queued until a delay time (latency) is reached and then sent to a destination point.

The magic packet 440 may contain data about a current TCP state between the client 405 and the server 410. Alternatively, the magic packet 440 may contain a reference to a database, in which data about the TCP state between the client 405 and the server 410 are stored.

Upon receiving the magic packet 440, the access control unit 420 may apply predetermined policies to the data traffic associated with the session (for example, apply filters 470) and re-establish the session based on the TCP state. Additionally, the access control unit 420 may instruct the client 405 to retransmit or recover a session request if a timer of the session is not expired, and the client 405 may send an "ACKnowledgement" message 445 to the access control unit 420.

Therefore, the access control unit 420 may act as a TCP proxy between the client 405 and the server 410. More specifically, from a perspective from the access control unit 420 to the server 410, the access control unit 420 may act as a client. From a perspective from the access control unit 420 to the client 405, the access control unit 420 may act as a server. The access control unit 420 may apply predetermined policies to the data traffic flow between the client 405 and the server 410 to provide a secure communication. Additionally, the access control unit 420 may process the data traffic flow using cryptography, such as elliptical curve cryptography, and the like.

If the client 405 sends a further session (not shown) to the server 410, there is no need to perform the TCP state handoff because the access control unit 420 already has a flow mapping for the client 405 and the server 410.

Figure 5:
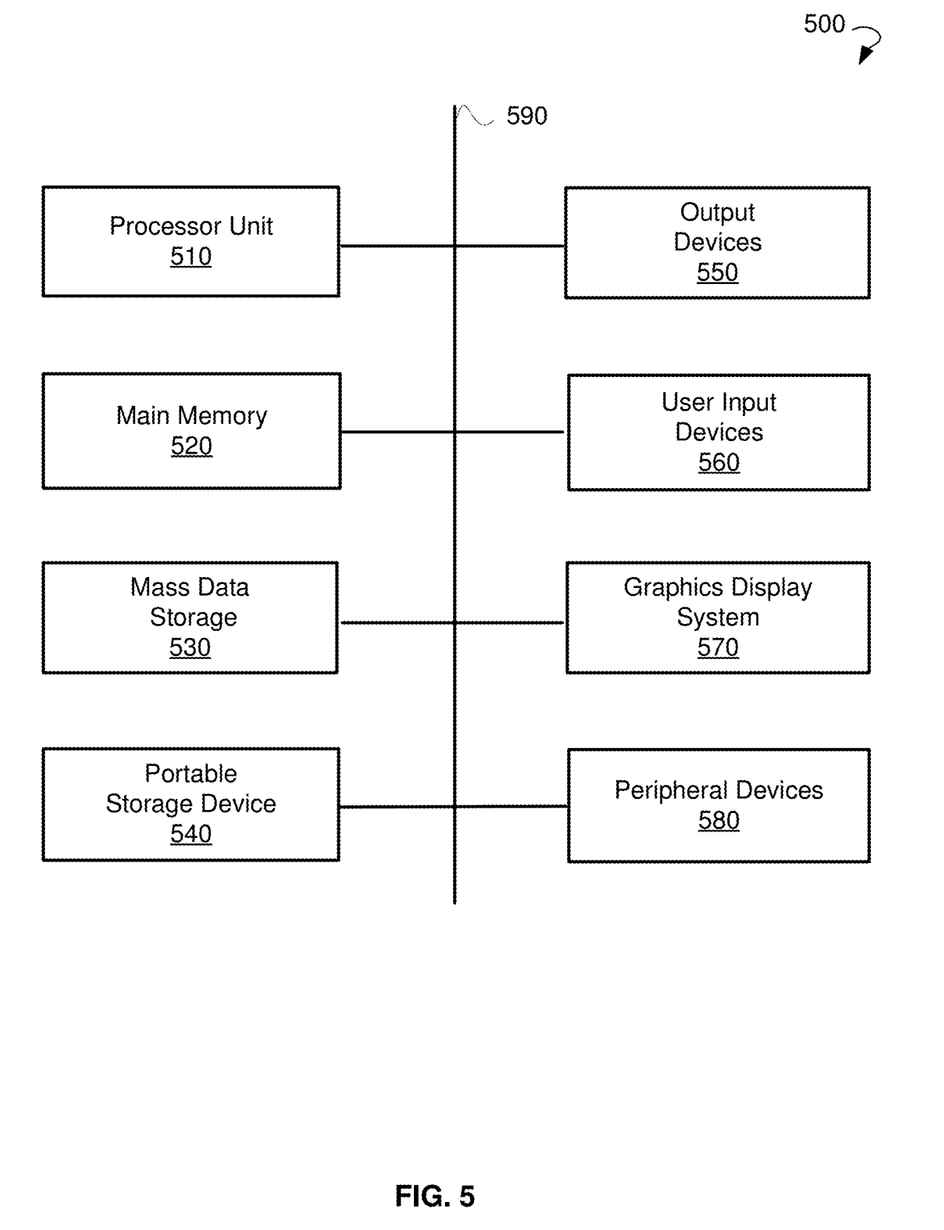
FIG. 5 shows a diagrammatic representation of a computing device for a machine, within which a set of instructions for causing the machine to perform any one or more of the methodologies discussed herein can be executed.

FIG. 5 illustrates an example computer system 500 that may be used to implement embodiments of the present disclosure. The computer system 500 may serve as a computing device for a machine, within which a set of instructions for causing the machine to perform any one or more of the methodologies discussed herein can be executed. The computer system 500 can be implemented in the contexts of the likes of computing systems, networks, servers, or combinations thereof. The computer system 500 includes one or more processor units 510 and main memory 520. Main memory 520 stores, in part, instructions and data for execution by processor 510. Main memory 520 stores the executable code when in operation. The computer system 500 further includes a mass data storage 530, portable storage device(s) 540, output devices 550, user input devices 560, a graphics display system 570, and peripheral devices 580. The methods may be implemented in software that is cloud-based.

The components shown in FIG. 5 are depicted as being connected via a single bus 590. The components may be connected through one or more data transport means. Processor unit 510 and main memory 520 are connected via a local microprocessor bus, and mass data storage 530, peripheral device(s) 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit 510. Mass data storage 530 stores the system software for implementing embodiments of the present disclosure for purposes of loading that software into main memory 520.

Portable storage device 540 operates in conjunction with a portable non-volatile storage medium, such as a floppy disk, CD, DVD, or USB storage device, to input and output data and code to and from the computer system 500. The system software for implementing embodiments of the present disclosure is stored on such a portable medium and input to the computer system 500 via the portable storage device 540.

User input devices 560 provide a portion of a user interface. User input devices 560 include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 includes output devices 550. Suitable output devices include speakers, printers, network interfaces, and monitors.

Graphics display system 570 includes a liquid crystal display or other suitable display device. Graphics display system 570 receives textual and graphical information and processes the information for output to the display device. Peripheral devices 580 may include any type of computer support device to add additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory (CD-ROM) disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for a TCP state handoff of a data traffic flow have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for a Transmission Control Protocol (TCP) state handoff of a data traffic flow, the system comprising:
 a hardware state machine unit configured to:
  determine a plurality of TCP states at predetermined times, each TCP state of the plurality of TCP states being separately determined at a particular predetermined time,
  wherein each of the plurality of TCP states includes data concerning a session between a client and a server at the particular predetermined time;
 a hardware transaction processing unit configured to:
  store the TCP state for each of the predetermined times to a database;
  receive a request to apply a predetermined policy to the session, wherein the session is processed by the hardware transaction processing unit and wherein the applying the predetermined policy to the session includes transferring the processing of the session to a hardware access control unit;
  based on the request, transfer the processing of the session from the hardware transaction processing unit to the hardware access control unit by sending a session request associated with the session between the client and the server to the hardware access control unit, the session request including a current TCP state of the plurality of TCP states, the current TCP state being the TCP state stored for a current time and including the data concerning the session for the current time, the session request further including an instruction to process the session according to the predetermined policy; and
 the hardware access control unit configured to:
  switch from a stand-by mode to an active mode based on receipt of the session request, the hardware access control unit operating in the stand-by mode in absence of session requests from the hardware transaction processing unit;
  upon switching to the active mode, in response to the instruction to process the session, act as a TCP proxy in the session between the client and the server by establishing the session between the hardware access control unit and the client and establishing the session between the hardware access control unit and the server based on the current TCP state; and
  based on the instruction included in the session request, process the session request and further data packets associated with the session based on the current TCP state and according to the predetermined policy.

2. The system of claim 1, wherein the processing of the session request includes establishing a further session between the client and the server, the further session being established based on the current TCP state retrieved by the hardware access control unit.

3. The system of claim 1, wherein the storing of the TCP state includes storing the TCP state to the hardware state machine unit.

4. The system of claim 1, wherein the processing includes sending a reset request to the client, the reset request prompting the client to resend the session request.

5. The system of claim 1, wherein the storing of the TCP state includes:
 initializing a further hardware state machine unit; and
 storing the TCP state to the further hardware state machine unit.

6. The system of claim 1, wherein the storing of the TCP state includes:
 encoding the TCP state into a signal; and
 sending the signal to the hardware access control unit.

7. The system of claim 1, wherein the session request is sent to the hardware access control unit using a magic packet, the magic packet including the TCP state and the instruction to process the session according to the predetermined policy.

8. The system of claim 1, wherein the data concerning the session include at least one or more of the following: a source port destination, a current sequence number, a window, a timestamp, and a timer.

9. The system of claim 1, wherein the hardware transaction processing unit is further configured to delay the sending of the session request until the hardware state machine unit determines the TCP state.

10. A method for a TCP state handoff of a data traffic flow, the method comprising:
 determining, by a hardware state machine unit, a plurality of TCP states at predetermined times, each TCP state of the plurality of TCP states being separately determined at a particular predetermined time, wherein each of the plurality of TCP states includes data concerning a session between a client and a server at the particular predetermined time;
storing, to a database, the TCP state for the predetermined times;
receiving, by a hardware transaction processing unit, a request to apply a predetermined policy to the session, wherein the session is processed by the hardware transaction processing unit and wherein the applying the predetermined policy to the session includes transferring the processing of the session to a hardware access control unit;
based on the request, transferring the processing of the session from the hardware transaction processing unit to the hardware access control unit by sending, by the hardware transaction processing unit, a session request associated with the session between the client and the server to the hardware access control unit, the session request including a current TCP state of the plurality of TCP states, the current TCP state being the TCP state stored for a current time and including the data concerning the session for the current time, the session request further including an instruction to process the session according to the predetermined policy; and
switching, by the hardware access control unit, from a stand-by mode to an active mode based on receipt of the session request, the hardware access control unit operating in the stand-by mode in absence of session requests from the hardware transaction processing unit;
upon switching to the active mode, in response to the instruction to process the session, acting, by the hardware access control unit, as a TCP proxy in the session between the client and the server by establishing the session between the hardware access control unit and the client and establishing the session between the hardware access control unit and the server based on the current TCP state; and
based on the instruction included in the session request, processing, by the hardware access control unit, the session request and further data packets associated with the session based on the current TCP state and according to the predetermined policy.

11. The method of claim 10, wherein the processing of the session request includes establishing a further session between the client and the server, the further session being established based on the current TCP state retrieved by the hardware access control unit.

12. The method of claim 10, wherein the storing of the TCP state includes storing the TCP state to the hardware state machine unit.

13. The method of claim 10, wherein the processing includes sending a reset request to the client, the reset request prompting the client to resend the session request.

14. The method of claim 10, wherein the storing of the TCP state further includes:
initializing a further hardware state machine unit; and
storing the TCP state to the further hardware state machine unit.

15. The method of claim 10, wherein the storing of the TCP state includes:
encoding the TCP state into a signal; and
sending the signal to the hardware access control unit.

16. The method of claim 10, wherein the session request is sent to the hardware access control unit using a magic packet, the magic packet including the TCP state and the instruction to process the session according to the predetermined policy.

17. The method of claim 10, wherein the data concerning the session include at least one or more of the following: a source port destination, a current sequence number, a window, a timestamp, and a timer.

18. The method of claim 10, wherein the predetermined policy includes one or more of the following: a security policy and a forwarding policy.

19. The method of claim 10, further comprising delaying, by the hardware transaction processing unit, sending the session request until the hardware state machine unit determines the TCP state.

20. A system for a TCP state handoff of a data traffic flow, the system comprising:
a hardware state machine unit configured to:
determine a plurality of TCP states at predetermined times, each TCP state of the plurality of TCP states being separately determined at a particular predetermined time,
wherein each of the plurality of TCP states includes data concerning a session between a client and a server at the particular predetermined time;
a hardware transaction processing unit configured to:
store the TCP state for each of the predetermined times to a database;
receive a request to apply a predetermined policy to the session, wherein the session is processed by the hardware transaction processing unit and wherein the applying the predetermined policy to the session includes transferring the processing of the session to a hardware access control unit;
based on the request, transferring the processing of the session from the hardware transaction processing unit to the hardware access control unit by sending a session request associated with the session between the client and the server to the hardware access control unit, the session request including a current TCP state of the plurality of TCP states, the current TCP state being the TCP state stored for a current time and including the data concerning the session for the current time, wherein the session request is sent to the hardware access control unit using a magic packet, the magic packet including the current TCP state and an instruction to process the session according to the predetermined policy; and
the hardware access control unit configured to:
switch from a stand-by mode to an active mode based on receipt of the session request, the hardware access control unit operating in the stand-by mode in absence of session requests from the hardware transaction processing unit;
upon switching to the active mode, in response to the instruction to process the session, act as a TCP proxy in the session between the client and the server by establishing the session between the hardware access control unit and the client and establishing the session between the hardware access control unit and the server based on the current TCP state; and
based on the instruction included in the session request, process the session request and further data packets associated with the session based on the current TCP state and according to the predetermined policy, wherein the processing of the session request includes establishing a further session between the client and the server, the further session being established based on the current TCP state retrieved by the hardware access control unit.

* * * * *